(12) United States Patent
Xiao

(10) Patent No.: US 10,424,216 B2
(45) Date of Patent: Sep. 24, 2019

(54) MUSICAL SCORE DISPLAY DEVICE

(71) Applicant: Ken Xiao, Sugar Land, TX (US)

(72) Inventor: Ken Xiao, Sugar Land, TX (US)

( * ) Notice: Subject to any disclaimer, the term of this patent is extended or adjusted under 35 U.S.C. 154(b) by 0 days.

(21) Appl. No.: 16/146,343

(22) Filed: Sep. 28, 2018

(65) Prior Publication Data
US 2019/0073919 A1 Mar. 7, 2019

(51) Int. Cl.
G09B 15/00 (2006.01)
G09B 15/02 (2006.01)
G10H 1/00 (2006.01)
G06F 3/02 (2006.01)
G10G 1/02 (2006.01)

(52) U.S. Cl.
CPC ......... G09B 15/023 (2013.01); G06F 3/0202 (2013.01); G10G 1/02 (2013.01)

(58) Field of Classification Search
CPC ........ G09B 15/023; G10G 1/02; G06F 3/0202
See application file for complete search history.

(56) References Cited

U.S. PATENT DOCUMENTS

| | | | | |
|---|---|---|---|---|
| 6,084,168 A * | 7/2000 | Sitrick | ................. | G09B 15/023 84/477 R |
| 7,041,890 B1 * | 5/2006 | Sutton | ................. | G09B 15/002 84/470 R |
| 8,431,809 B1 * | 4/2013 | Chan | ...................... | G09B 15/02 84/470 R |
| 8,835,741 B2 * | 9/2014 | Zhonggang | ............... | G06F 3/02 84/483.1 |
| 9,911,354 B2 * | 3/2018 | Oliver | .................. | G09B 15/023 |
| 9,922,629 B1 * | 3/2018 | Whiteside | ................ | G10G 1/00 |
| 2003/0110925 A1 * | 6/2003 | Sitrick | ................. | G09B 15/002 84/477 R |
| 2008/0047413 A1 * | 2/2008 | Laycock | .................. | G09B 5/12 84/477 R |
| 2011/0203442 A1 * | 8/2011 | Raveendran | ......... | G09B 15/023 84/483.1 |
| 2014/0320442 A1 * | 10/2014 | Chan | .................... | G09B 15/023 345/174 |
| 2015/0364055 A1 * | 12/2015 | Oliver | .................. | G09B 15/023 84/746 |
| 2018/0330699 A1 * | 11/2018 | Buttemer | ................. | G10G 1/00 |

* cited by examiner

Primary Examiner — Jeffrey Donels

(57) ABSTRACT

A musical score display device is provided, the device include a display section to display musical score representing a predetermined piece of music; a memory to store the musical score; an input section to transmit document of the musical score into the memory; a wireless transmitter module to transmit signal of turning pages of the score; a wireless receiver module to receiver the signal of turning pages of the score; a controller that control the display section, the memory, the input section and the wireless receiver module. The device can be easily operated when playing the music.

4 Claims, 5 Drawing Sheets

MUSICAL SCORE DISPLAY DEVICE

FIELD

The disclosure relates generally to a musical score display device. The disclosure relates specifically to a musical score display device that can update the musical score.

BACKGROUND

Generally, people use scores when practicing or playing a musical instrument such as a violin. In other words, except a special case such as a test, people refer to a score when practicing or playing music. Players of a symphony orchestra write down interpretation instructed by a conductor on a score and refer to it when playing. For long time paper musical score have been used to play music. With long composition, it became necessary to turn pages during performance. It has been trouble to players who use both hands, for example violin players. Therefore, the players cannot be devoted to only performance.

In order to solve the problem, conventionally, an additional apparatus such as a timer or pedal is installed at a music stand, which is used for holding a score, so that players can turn pages of the score without using a hand. However, according to these methods, it is difficult to appropriately set a time, at which a page of a score is turned, due to difference in performance tempo among players.

SUMMARY

To overcome the above problems, it is an object of the present invention to provide a musical score display device by which the musical score can be easily seen when playing the music, and which is conveniently portable and allows easy recognition of the musical score at all times.

In order to achieve the object described above, the musical score display device of the present invention includes: a display section to display musical score representing a predetermined piece of music; a memory that store the musical score, an input section to transmit the document of the musical score into the memory; a wireless receiver module to receiver signal turning pages of the score; a wireless transmitter module to transmit signal of turning pages of the score; a controller that control the display section, the memory, the input section and the wireless receiver module. When the wireless receiver module receives a signal of turning pages of the score, the controller controls the display section to display the next or previous page of the score.

In some embodiments pertaining to the display section, it comprises a liquid crystal display.

In some embodiments pertaining to the wireless transmitter module, it is attached to a bow for playing a string instrument. In a preferred embodiment, the wireless transmitter is accommodated at an outer end portion of a frog of the bow, the wireless transmitter module has two buttons protruding through an outer end face of the frog to control the wireless transmitter to send page turning information to the wireless receiver module.

In some embodiments pertaining to the wireless transmitter module, it includes a digital encoder to generate digital signal representing page turning and a serial number of the musical score display device.

The foregoing has outlined rather broadly the features of the present disclosure in order that the detailed description that follows may be better understood. Additional features and advantages of the disclosure will be described hereinafter, which form the subject of the claims.

BRIEF DESCRIPTION OF THE DRAWINGS

In order that the manner in which the above-recited and other enhancements and objects of the disclosure are obtained, a more particular description of the disclosure briefly described above will be rendered by reference to specific embodiments thereof which are illustrated in the appended drawings. Understanding that these drawings depict only typical embodiments of the disclosure and are therefore not to be considered limiting of its scope, the disclosure will be described with additional specificity and detail through the use of the accompanying drawings in which.

DETAILED DESCRIPTION

The following definitions and explanations are meant and intended to be controlling in any future construction unless clearly and unambiguously modified in the following examples or when application of the meaning renders any construction meaningless or essentially meaningless. In cases where the construction of the term would render it meaningless or essentially meaningless, the definition should be taken from Webster's Dictionary $3^{rd}$ Edition.

Figure 1:
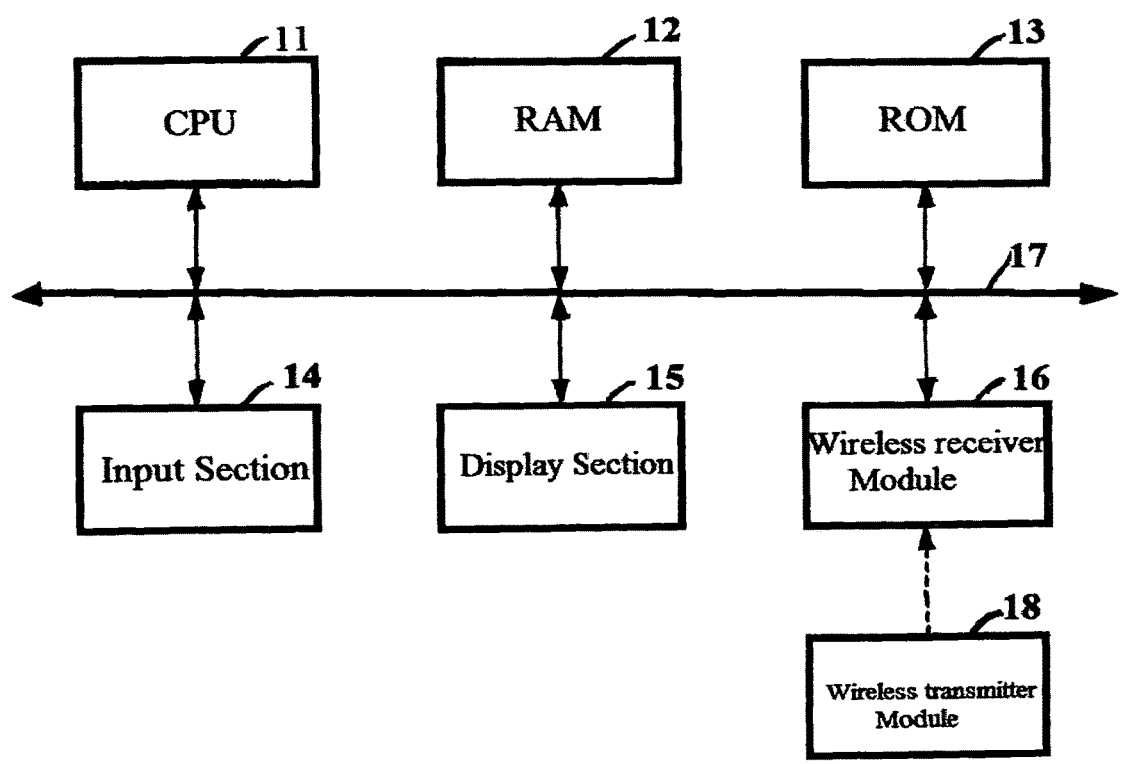
FIG. 1 is a block diagram showing hardware structures of a musical score display device in accordance with the embodiment of the present invention.

FIG. 1 is a block diagram showing hardware structures of a musical score display device in accordance with the embodiment of the present invention.

A musical score display device is equipped with a central processing unit (CPU) 11, a read-only memory (ROM) 13, a random access memory (RAM) 12, a bus 17, an input section 14, a display section 15, a wireless receiver module 16, and a wireless transmitter module 18. The CPU 11 starts various programs stored in the ROM 13, and performs respective processes in accordance with event, in this embodiment, the CPU 11 has various kinds of functions for realizing musical score display. The input section 14 is the interface of the device such as keyboard or a mouse. In a preferred embodiment, a touchscreen can be used without a mouse or keyboard connected to the system. The input section further includes a document input unit. The document input unit may be a USB flash driver, an optical disc driver, or a floppy disk driver. Each of them can transmit the documents of the musical score into the musical score display device respectively from a USB flash device, an optical disc or a floppy disk. The file formats of documents of the musical score can be any kinks that the device can identify. The typical formats can be image or PDF format.

The display section is formed with a display device such as a LCD (liquid crystal display) that is capable of displaying the documents of the musical score, and has a screen of a predetermined size. In this embodiment, a touch panel is used as the input section, and the touch panel is placed on the screen of the display unit.

The CPU can control the document input unit to transmit data of the documents of the musical score from outer storage such as a USB flash device into the RAM. A user can use touch panel to open the document. Upon receiving the signal from the touch panel, the CPU controls the display section to access the RAM through bus 17 to get data of the selected document to display the first page of the musical score.

When a player wants to turn to the next page, he or she can operate a wireless transmitter module 18 to transmit signal of turning pages of the score, the wireless receiver module 16 receives the signal from the transmitter module 18, and the CPU 11 controls the display section to display the next page of the score. The wireless transmitter 18 can be controlled by a pedal, such that the player can use a foot to trigger a signal to turn page without using hands, therefore, the player can devote to only performance.

All the element of the musical score display device, except the wireless transmitter module 18 can be integrated into a house to powered by a battery.

In a preferred embodiment, when a string instrument such as a violin, a viola, a cello or a bass played by a bow, the wireless transmitter module 18 can be integrally formed with the bow, or attached to the bow.

Figure 2:
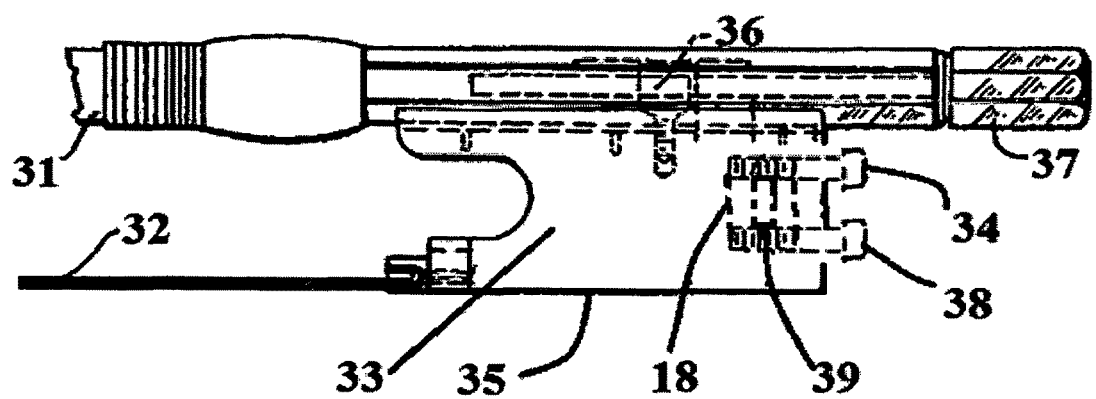
FIG. 2 is a side view of part of a bow comprising a wireless transmitter module.

For example, referring to FIG. 2, FIG. 2 is a side view of part of a bow comprising a wireless transmitter module, the bow includes a bow stick 31 and a hair band 32 connected to a frog 35 adjustable in the usual way relative to the stick 31. The frog 35 includes a body 33, the body 33 is recessed to accommodate a tension nut member 36 which cooperates with the bow adjusting screw 37. In a preferred embodiment, the end portion of the body 33 is recessed to accommodate a wireless transmitter module 18, the wireless transmitter module has two buttons 34 and 38 protruding through the outer end face of the frog 35. The wireless transmitter module has a digital encoder 39 electrically connected to the two buttons. When the upper button 34 is pushed, the digital encoder 39 generates a digital signal representing page forward, and when the lower button 38 is pushed, the digital encoder generates a digital signal representing page backward, the digital encoder 39 further generates a serial number representing a musical score display device. The wireless transmitter module 18 has an antenna (not shown) to send out data package including the serial number and page forward or page backward signal in radio waves.

The wireless receiver module 16 has an antenna (not shown) to receive the data package transmitted from the wireless transmitter module 18. The musical score display device receives the signal and turns the page forward or backward according to the message of the data package.

Figure 3:
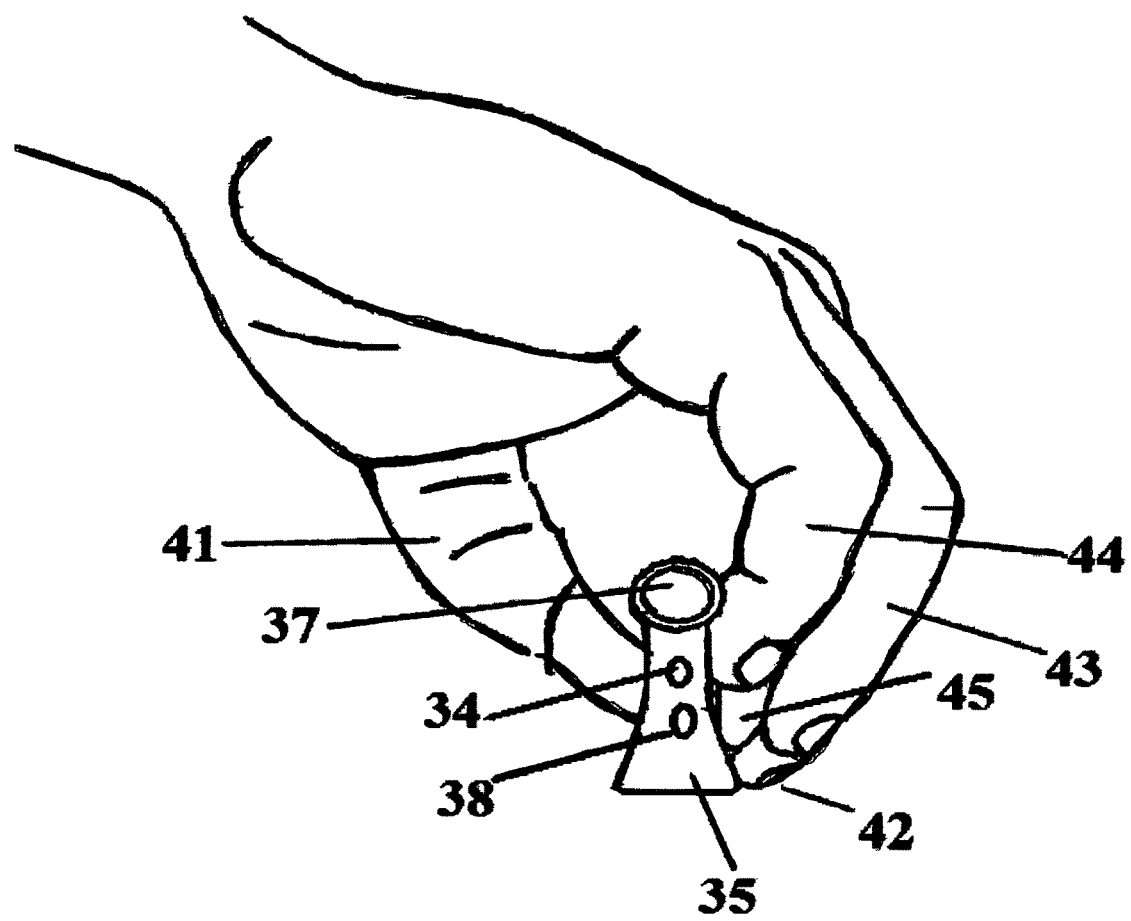
FIG. 3 is a view of an end of a bow with fingers disposed thereon.
Figure 4:
FIG. 4 first page of a score displaying on display device.

FIG. 3 is a view of an end of a bow with fingers disposed thereon on, the thumb 41 is disposed on one side of the frog, index finger 45, middle finger 42, ring finger 43, and pinky finger 44 are rest on the stick, the pinky finger 44 is near the buttons 34,38 of the wireless transmitter module 18 on the outer end face of the frog 35, when a player plays music, the player can turn on the power of the musical score display device, transmit data of the documents of the musical score from outer storage such as a USB flash device into the RAM of the musical score display device through the USB flash driver, the player then open a document through keyboard or a mouse or touchscreen. The first page of a score (such as Symphony No. 5, Tchaikovsky, 4th Movement) is displayed on display device shown in FIG. 4. After that, the player can put the musical score display device on a score table and play a string instrument with a bow while referring the score shown on the display device. After finishing the play of the instant page, the player can easily use the pinky finger 44 to press the buttons of the wireless transmitter module 18 without interfere the playing. When the upper button 34 is pushed, the digital encoder generates a data package including digital signal representing page forward and a serial number, the musical score display device receives the signal and turns the page forward. Sometimes the player wants to turn back the score, he can press the lower button 38, the musical score display device receives the signal and turns the page backward.

Figure 5:
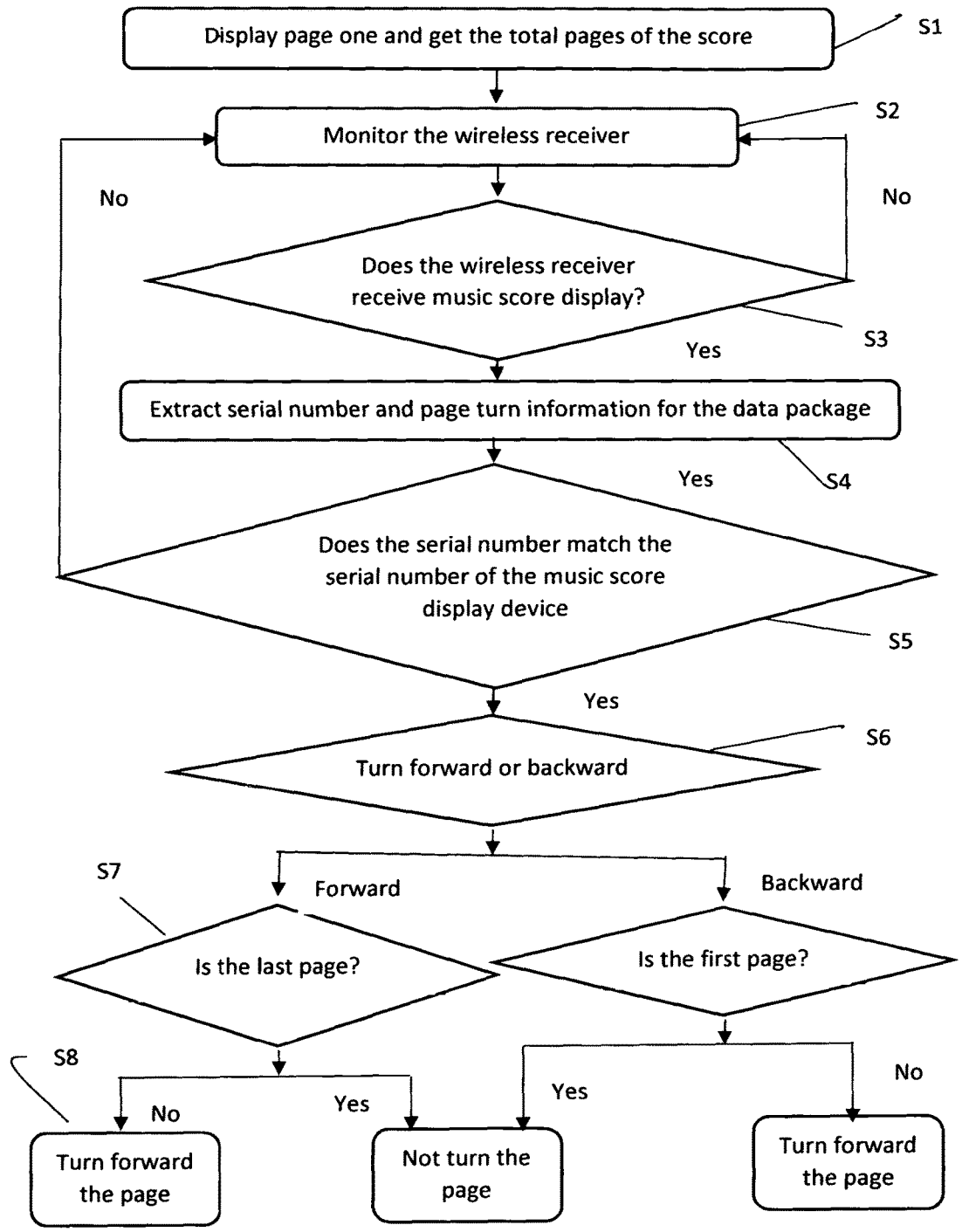
FIG. 5 is a flowchart showing a main flow of processing that is executed in the musical score display device.

FIG. 5 is a flowchart showing a main flow of processing that is executed in the musical score display device in accordance with the embodiment of the present invention.

In step 1, the CPU 11 controls the display section to display the first page of the score and gets the total pages of the score. In step 2, the CPU 11 monitors the wireless receiver module 16. In step 3, the CPU determines that if there are data package received by the wireless receiver module 16, if the wireless receiver module does not receive data package from the wireless transmitter module, it continues to monitor the wireless receiver module 16. In step 4, if the wireless receiver module 16 receives data package from the wireless transmitter module 18, the CPU 11 extract serial number and page turn information form the data package. In an orchestra, there are many instruments to be played, each player may have different score and each has his or her own the musical score display device. To avoid interfere with each other, each musical score display device has its own distinctive serial number to distinguish it from others. In step 5, the CPU checks the extract serial number from the data package, compares the extract serial number with its own serial number, if there are not matched, the process come back to step 2 to monitors the wireless receiver module. If there are matched, in step 6, the CPU recognizes that the player wanting to turn the page of the score, and determines to turn forward or backward according to the page turn information form the data package. In steps 7 and 8, if page turn information is forward, the CPU 11 will check whether or not the instant page is the last page, if it is not, it will control the display section 15 to display the next page of the score. Otherwise, it will not turn the page. If page turn information is backward, the CPU 11 will check whether or not the instant page is the first page, if it is not, it will control the display section 15 to display the previous page of the score. Otherwise, it will not turn the page.

What is claimed is:

1. A musical score display device comprising:
   a display section to display a musical score representing a predetermined piece of music;
   a memory to store the musical score;
   an input section to transmit document of the musical score into the memory;
   a wireless transmitter module to transmit a signal of turning pages of the score;
   a wireless receiver module to receive the signal of turning pages of the score;
   a controller to control the display section, the memory, the input section and the wireless receiver module;
   wherein the wireless transmitter module is attached to a bow for playing a string instrument, and
   wherein when the wireless receiver module receives the signal of turning pages of the score from the wireless transmitter module, the controller controls the display section to display a next or previous page of the score.

2. The musical score display device of claim 1, wherein the display section comprising a liquid crystal display.

3. The musical score display device of claim 1, wherein the wireless transmitter is accommodated at an outer end portion of a frog of the bow, the wireless transmitter module comprises two buttons protruding through an outer end face of the frog to control the wireless transmitter to send the page turning signal to the wireless receiver module.

4. The musical score display device of claim 1, wherein the wireless transmitter including a digital encoder to generate digital signal representing page turning and a serial number of the musical score display device.

* * * * *